United States Patent [19]
Jurewicz et al.

[11] Patent Number: 5,499,512
[45] Date of Patent: Mar. 19, 1996

[54] METHODS AND APPARATUS FOR CONVERTING A MANUALLY OPERABLE REFRIGERATION UNIT TO REMOTE OPERATION

[75] Inventors: Romuald M. Jurewicz, St. Louis Park; Albert C. K. Wong, Golden Valley; Verlon J. Wirth, Apple Valley, all of Minn.

[73] Assignee: Thermo King Corporation, Minneapolis, Minn.

[21] Appl. No.: 422,690

[22] Filed: Apr. 14, 1995

Related U.S. Application Data

[63] Continuation of Ser. No. 239,492, May 9, 1994, abandoned.

[51] Int. Cl.$^6$ .................................................. G05D 23/00
[52] U.S. Cl. ...................... 62/229; 236/51; 340/870.17
[58] Field of Search ............................... 62/229; 236/51; 165/22; 340/870.17

[56] References Cited

U.S. PATENT DOCUMENTS

| 4,325,224 | 4/1982 | Howland | 62/196.1 |
| 4,419,866 | 12/1983 | Howland | 62/228.4 |
| 4,829,779 | 5/1989 | Munson et al. | 236/51 |
| 4,885,564 | 12/1989 | Vercellotti et al. | 340/310 A |
| 4,903,498 | 2/1990 | Hansen | 62/126 |
| 5,181,389 | 1/1993 | Hanson et al. | 62/126 |
| 5,275,011 | 1/1994 | Hanson et al. | 62/229 X |
| 5,275,011 | 1/1994 | Hanson et al. | 62/229-1 |

OTHER PUBLICATIONS

XICOR Nonvolatile Solutions Data Book, pp. 4–1 through 4–12, a publication by XICOR, Inc.—1992.

*Primary Examiner*—William E. Wayne
*Attorney, Agent, or Firm*—M. G. Panian

[57] ABSTRACT

Methods and apparatus for converting a refrigeration unit having a manually controlled thermostat to remote operation via a data logger, without replacing the manually controlled thermostat. A set point temperature selector associated with the thermostat is fixed at a predetermined value, and a resistance temperature detector (RTD), which is normally connected to a temperature input of the thermostat, is disconnected. A set point temperature for a space conditioned by the refrigeration unit is selected via the data logger. The data logger monitors the temperature of the conditioned space, compares the temperature of the conditioned space with the set point temperature selected via the data logger, and determines an operating mode for the refrigeration unit which will cause the temperature of the conditioned space to be maintained in a predetermined range relative to the set point temperature selected via the data logger. A potentiometer is connected between the data logger and the temperature input of the thermostat. The data logger adjusts the resistance of the potentiometer to correspond to a temperature of the RTD, which, relative to the predetermined set point temperature fixed on the set point temperature selector associated with the thermostat, will cause the thermostat to implement the operating mode determined by the data logger.

7 Claims, 7 Drawing Sheets

FIG. 3

| DIGITAL COUNT VALUE | | | | | | | | R OF POT (Ω) | R INPUT TO THERMOSTST 3200 + R Ω | ΔT OF R INPUT | |
|---|---|---|---|---|---|---|---|---|---|---|---|
| 0 | 0 | 0 | 0 | 0 | 0 | 0 | 0 | 0.0 | 3200.0 | 13.6 | |
| 0 | 0 | 0 | 0 | 0 | 0 | 0 | 1 | 7.87 | 3207.9 | 12.0 | |
| 0 | 0 | 0 | 0 | 0 | 0 | 1 | 0 | 15.74 | 3215.7 | 10.3 | |
| 0 | 0 | 0 | 0 | 0 | 0 | 1 | 1 | 23.61 | 3223.6 | 8.7 | |
| 0 | 0 | 0 | 0 | 0 | 1 | 0 | 0 | 31.48 | 3231.5 | 7.1 | HSH-NIR |
| 0 | 0 | 0 | 0 | 0 | 1 | 0 | 1 | 39.35 | 3239.4 | 5.5 | |
| 0 | 0 | 0 | 0 | 0 | 1 | 1 | 0 | 47.22 | 3247.2 | 3.9 | HSH-IR |
| 0 | 0 | 0 | 0 | 0 | 1 | 1 | 1 | 55.09 | 3255.1 | 2.2 | |
| 0 | 0 | 0 | 0 | 1 | 0 | 0 | 0 | 62.96 | 3263.0 | 0.6 | LSH-IR |
| 0 | 0 | 0 | 0 | 1 | 0 | 0 | 1 | 70.83 | 3270.8 | -1.0 | |
| 0 | 0 | 0 | 0 | 1 | 0 | 1 | 0 | 78.70 | 3278.7 | -2.6 | LSC-IR |
| 0 | 0 | 0 | 0 | 1 | 0 | 1 | 1 | 86.57 | 3286.6 | -4.2 | |
| 0 | 0 | 0 | 0 | 1 | 1 | 0 | 0 | 94.44 | 3294.4 | -5.9 | HSC-IR |
| 0 | 0 | 0 | 0 | 1 | 1 | 0 | 1 | 102.31 | 3302.3 | -7.5 | HSC-NIR |

| MODE | DIGITAL COUNT VALUE | | | | | | | ΔT |
|---|---|---|---|---|---|---|---|---|
| HSC-NIR | 0 | 0 | 0 | 1 | 1 | 0 | 1 | -7.5 |
| HSC-IR | 0 | 0 | 0 | 1 | 1 | 0 | 0 | -5.9 |
| LSC-IR | 0 | 0 | 0 | 1 | 0 | 1 | 0 | -2.6 |
| LSH-IR | 0 | 0 | 0 | 1 | 0 | 0 | 0 | 0.6 |
| HSH-IR | 0 | 0 | 0 | 0 | 1 | 1 | 0 | 3.9 |
| HSH-NIR | 0 | 0 | 0 | 0 | 1 | 0 | 0 | 7.1 |

ROM MAP (78)

*FIG.6*

RAM MAP (80)
- SP
- RA
- ΔT
- STORED RA
- MODE (REQUIRED)
- MODE (STORED)
- U/D̄
- COUNTER VALUE

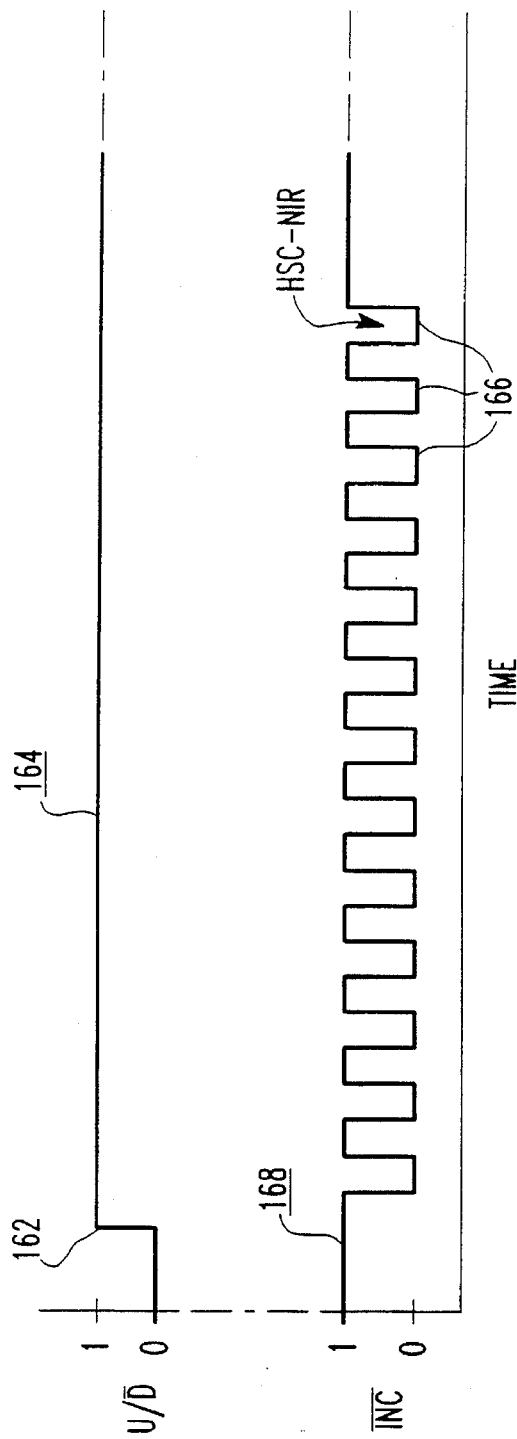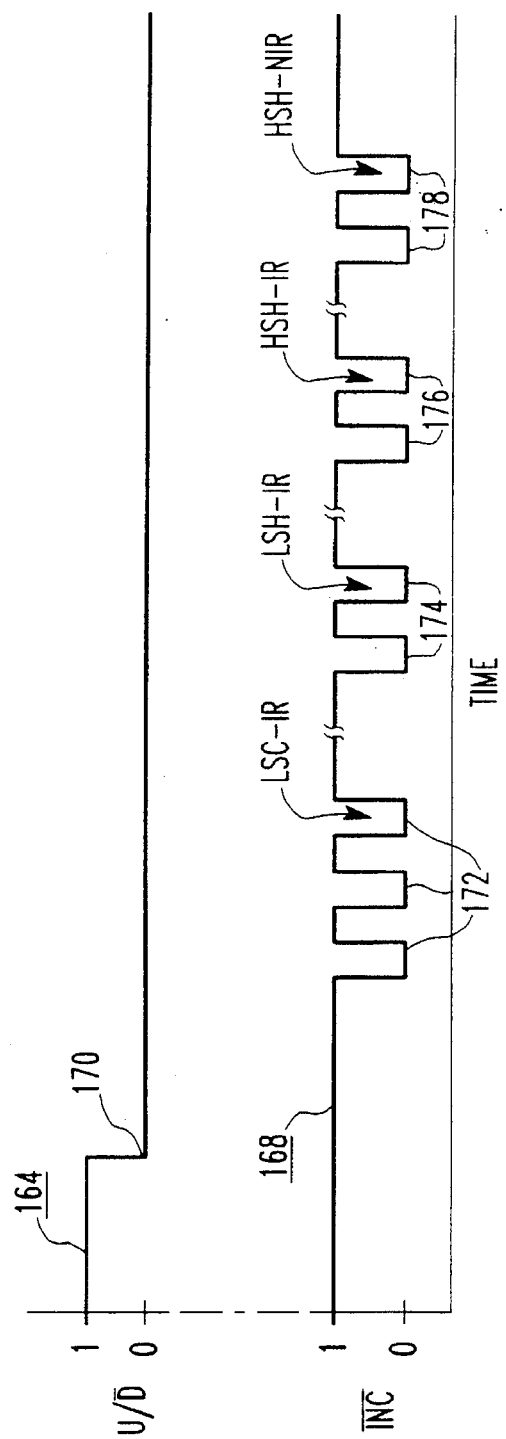

METHODS AND APPARATUS FOR CONVERTING A MANUALLY OPERABLE REFRIGERATION UNIT TO REMOTE OPERATION

This application is a continuation of U.S. application Ser. No. 08/239,492 filed May 9, 1994, now abandoned.

TECHNICAL FIELD

The invention relates in general to refrigeration units, and more specifically to transport refrigeration units, such as refrigeration units associated with straight trucks, tractor-trailer units, containers, and the like.

BACKGROUND ART

It is common for a transport refrigeration unit to be controlled by a manually operated thermostat. A set point temperature for a space served or conditioned by the refrigeration unit is manually selected on a set point temperature selector, and a temperature input on the thermostat receives an input signal in the form of a resistance value in ohms from a resistor temperature detector (RTD) disposed to detect the temperature of the conditioned space. The thermostat compares the set point temperature with the temperature of the conditioned space, which is usually the temperature RA of the air returning to the refrigeration unit from the conditioned space, called return air, to provide a difference temperature $\Delta T$. A control algorithm then selects the operating condition of heat and speed relays in response to the polarity and magnitude of the difference temperature $\Delta T$, which forces the refrigeration unit to run in an operating mode which will maintain the temperature of the conditioned space in a predetermined temperature range adjacent to the selected set point temperature. For example, the operating mode may be selected from operating modes such as high speed cool (HSC), low speed cool (LSC), low speed heat (LSH) and high speed heat (HSH). The "low" and "high" speeds refer to two selectable operating speeds for a refrigerant compressor, which may be driven by an internal combustion engine, such as a diesel engine, or an electric motor. Examples of low and high operating speeds are 1400 and 2200 RPM, respectively.

It is also common to provide a data logger for such a transport refrigeration unit, such as a data management system available from the assignee of the present application identified as DMS-II D/S, which records the set point temperature, the temperature RA of the return air, the temperature DA of the discharge air, and the like. The data logger has a microprocessor controller which enables it to communicate with a personal computer (PC), with a modem associated with power line carrier communications, with satellite communications, and the like.

The refrigeration unit cannot be operated remotely without replacing the manual thermostat with a more costly microprocessor based temperature controller, and the data logger cannot operate the refrigeration unit because it has no control over the relays, control valves, and the like, of the refrigeration unit.

It would be desirable, and it is an object of the present invention to be able to operate a refrigeration unit remotely, with the refrigeration unit being of the type which has a manually operable thermostat and a data logger, without the necessity of replacing the manually operable thermostat.

SUMMARY OF THE INVENTION

Briefly, the invention includes a method of converting a refrigeration unit to remote control using a data logger which is remotely operable. The refrigeration unit includes a thermostat having a temperature input connected to a temperature sensor responsive to the temperature of a space conditioned by the refrigeration unit, and set point selector means for selecting a set point temperature for the conditioned space. The method comprises the steps of fixing the set point selector means at a predetermined temperature, disconnecting the temperature sensor from the temperature input of the thermostat, connecting a temperature sensor responsive to the temperature of the conditioned space to a temperature input of the data logger, and selecting a set point temperature for the conditioned space via the data logger. The method then includes the steps of determining the operating mode required to hold the selected set point temperature, and providing a signal for the temperature input of the thermostat which forces the thermostat to implement the required operating mode.

The invention also relates to a refrigeration unit which controls the temperature of a conditioned space, with the refrigeration unit including a thermostat having a temperature input, set point temperature selector means for the thermostat, data logger means having a temperature input, temperature sensor means disposed to monitor the temperature of the conditioned space, and means connecting the temperature sensor means to the temperature input of the data logger means. An improvement to the refrigeration unit according to the invention comprises means setting the set point temperature selector means of the thermostat at a predetermined fixed value, and means selecting the set point temperature of the conditioned space via the data logger means. The data logger means includes operating mode selector means responsive to the set point temperature selected via the data logger means and to the temperature of the conditioned space for selecting an operating mode of the refrigeration unit which will maintain the temperature of the conditioned space in a predetermined temperature range adjacent to the selected set point temperature. Translating means is connected between the data logger means and the temperature input of the thermostat. The translating means provides a signal for the temperature input of the thermostat having a value relative to the set point temperature fixed on the set point selector means of the thermostat which forces the thermostat to implement the operating mode of the refrigeration unit selected by the operating mode selector means of the data logger means.

BRIEF DESCRIPTION OF THE DRAWINGS

The invention will become more apparent by reading the following detailed description in conjunction with the drawings, which are shown by way of example only, wherein:

FIG. 3 is a chart which illustrates digital count values and associated resistance values of a digitally controlled potentiometer shown in FIG. 1, as well as a $\Delta T$ for each resistance value when a set point temperature selector of the manually operable thermostat shown in FIG. 1 is fixed at 32° F. (0° C.);

FIG. 5 is a ROM map derived from the chart shown in FIG. 3, which is utilized by the program shown in FIG. 4;

FIG. 6 is a RAM map illustrating certain variables utilized by the program shown in FIG. 4;

FIGS. 8A and 8B may be combined to provide graphs which illustrate control signals versus time which are provided by the data logger for operating the digitally controlled potentiometer to select the various refrigeration unit operating modes associated with the control algorithm shown in FIG. 2.

DESCRIPTION OF PREFERRED EMBODIMENTS

Figure 1:
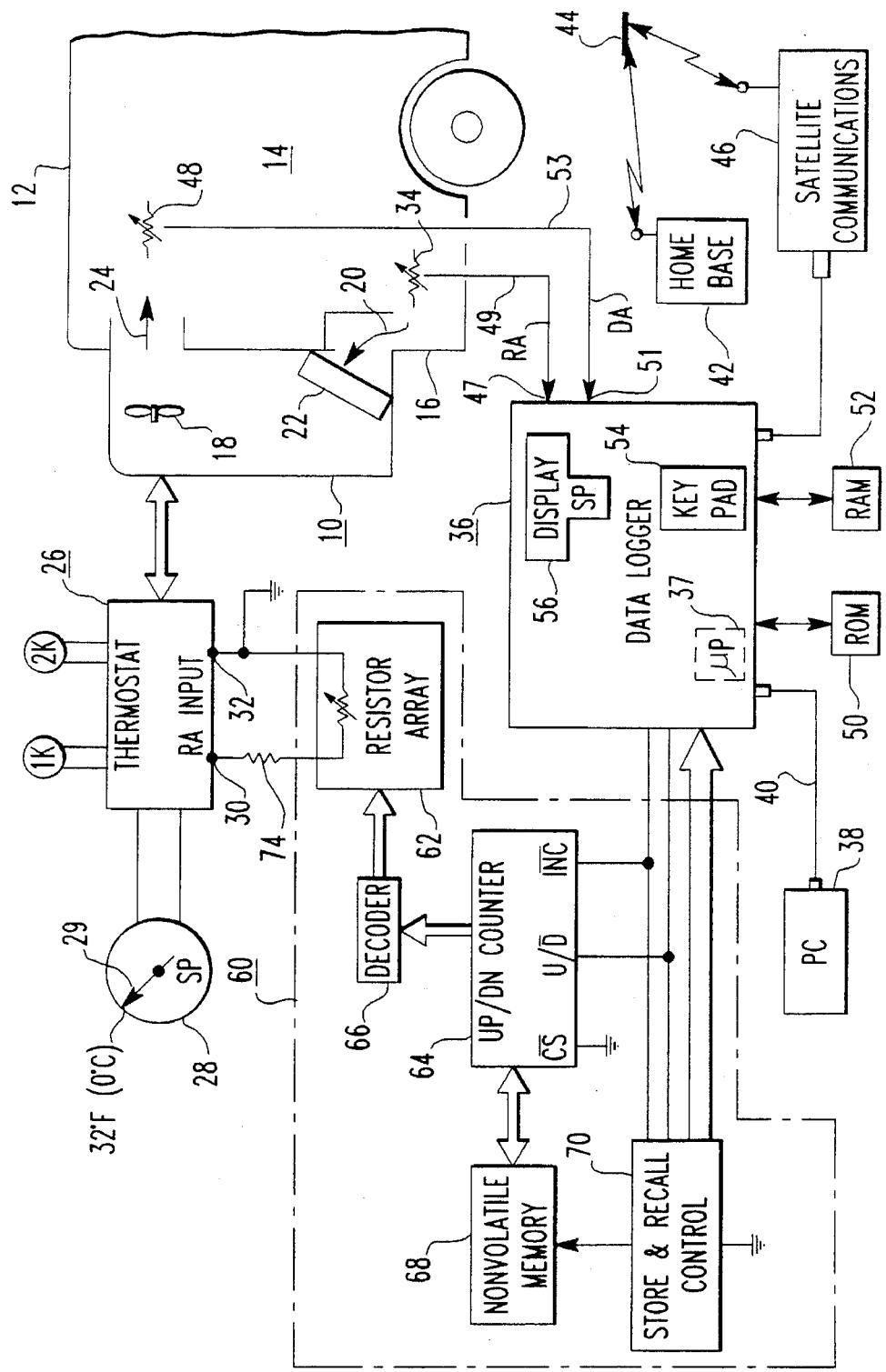
FIG. 1 is a partially block and partially schematic diagram of a refrigeration unit having a manually operable thermostat and a data logger, constructed according to the teachings of the invention wherein the refrigeration unit is remotely operable via the data logger.

Referring now to the drawings, and to FIG. 1 in particular, there is shown a refrigeration unit 10, such as a transport refrigeration unit associated with a truck, trailer, container, or the like, hereinafter referred generally as vehicle 12. Vehicle 12 defines a space 14 to be conditioned or served by refrigeration unit 10. Refrigeration unit 10, which may be mounted on a wall 16 of vehicle 12, for example, includes an evaporator fan or blower 18. Fan or blower 18 draws air, called return air, indicated by arrow 20, from conditioned space 14, and through an evaporator coil 22. The resulting conditioned air, called discharge air, indicated by arrow 24, is discharged back into conditioned space 14.

Refrigerant valves and other control devices associated with refrigeration unit 10 are controlled by a manually operable thermostat 26. Thermostat 26 has a set point temperature selector 28 which is manually actuated to select the desired set point temperature SP of conditioned space 14. Thermostat 26 has inputs 30 and 32 which normally receive a signal from a return air, RTD type, temperature sensor 34 disposed to sense the temperature of the return air 20 and provide a signal RA responsive to the temperature thereof. As illustrated in FIG. 1, according to the teachings of the invention, RTD sensor 34 is not connected to inputs 30 and 32.

As hereinbefore stated, sensor 34 is a resistance temperature detector (RTD) which has a predetermined resistance change for each degree temperature change. For purposes of example, sensor 34 will be assumed to be RTD sensor #2908B07 available from the assignee of the present application, which has a resistance change of 4.86 ohms/° F. (8.75 ohms/° C.), and a resistance of 3266 ohms at 32° F. (0° C.). The resistance change is uniform over the operating temperature range of refrigeration unit 10, such as −20° to +80° F. (−28.9° to 26.7° C.).

In addition to not connecting sensor 34 to inputs 30 and 32 of thermostat 26, the set point temperature selector 28 is fixed at a predetermined set point temperature. For purposes of example the predetermined, fixed, set point temperature will be assumed to be 32° F. (0° C.). This may be accomplished, for example, by removing a temperature setting pointer 29 from device 28, after setting pointer of device 28 has been set to the desired position; or, if the set point temperature is selected by key pad, the set point selecting key pad may be covered and locked after the desired fixed set point selection has been made.

A data logger 36 is associated with refrigeration unit 10, which normally records data concerning the operation of refrigeration unit 10 at predetermined timed intervals. Data logger 36, for purposes of example, will be assumed to be the hereinbefore mentioned data management system DMS II D/S available from the assignee of the present application. Data logger 36 has a microprocessor 37 which enables it to download stored information to a personal computer (PC) 38 which is selectively connectable to data logger 36 via a serial connector 40. When vehicle 12 is an over-the-road vehicle, information concerning the operation of refrigeration unit 10 may be communicated back to a home operating base 42 via a satellite 44 and satellite communication means 46 mounted on vehicle 12. Satellite communication means 46 is available commercially from QualComm Inc., San Diego, Calif. 92121. Data logger 36 may also be selectively connected to a serial printer.

When vehicle 12 is a refrigerated container stored on a ship, or in a shipyard, instead of satellite communications, data logger 36 may communicate with a central control point over an electrical power line associated with the ship, or shipyard, using power line carrier apparatus. U.S. Pat. No. 4,885,564, which is assigned to the same assignee as the present application, illustrates power line carrier communication apparatus for monitoring refrigerated containers which may be used.

Data logger 36 receives signal RA at a temperature input 47, via conductor means 49, which signal is responsive to the temperature of the return air 20. The sensor which provides signal RA may be sensor 34, the same RTD sensor which would normally be connected to inputs 30 and 32 of thermostat 26, or a different sensor may be used, as desired. Data logger 36 may also monitor other parameters of refrigeration unit 10, such as by receiving a temperature DA of the discharge air 24 at another temperature input 51, via a RTD sensor 48 and conductor means 53.

Figure 4:
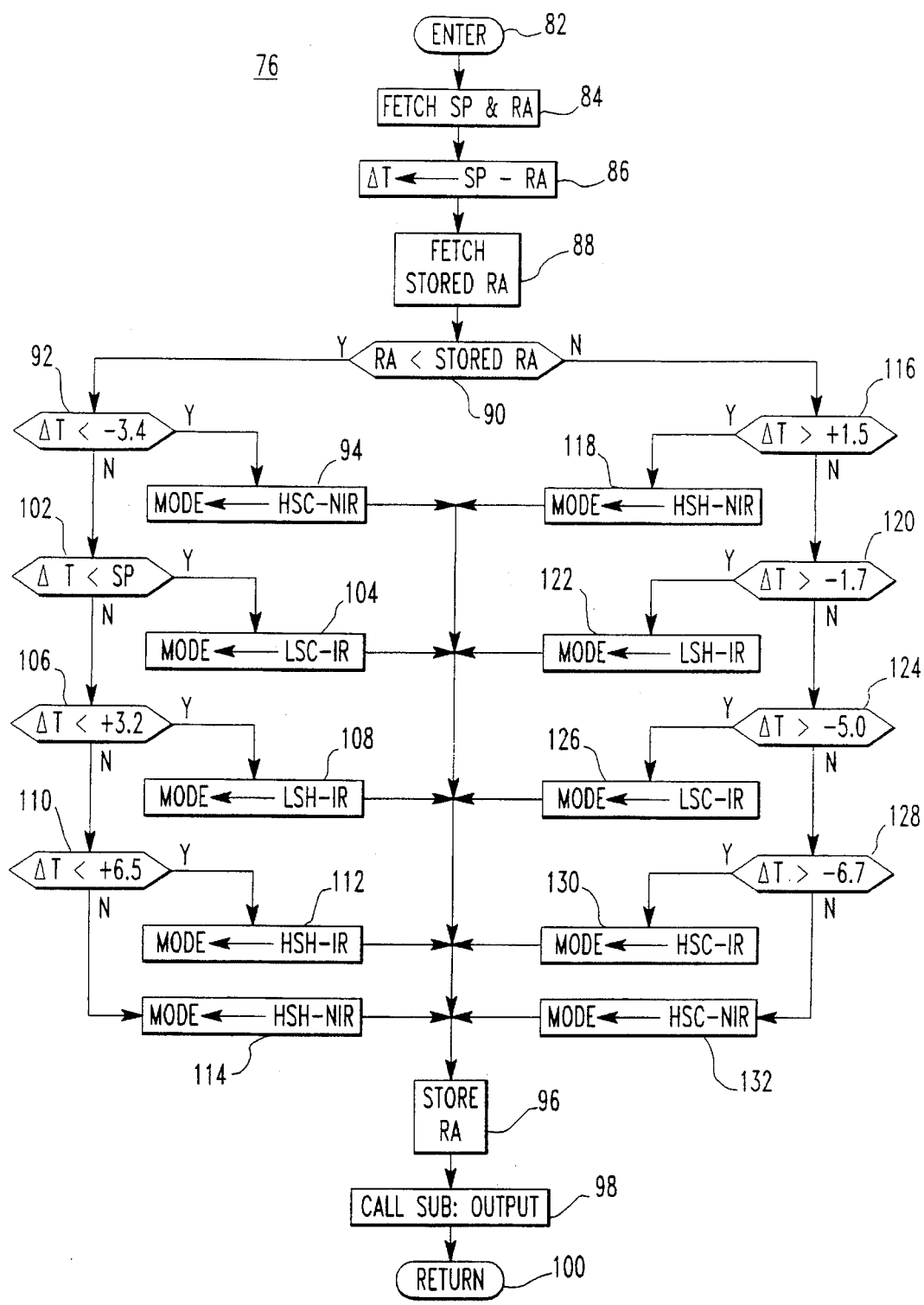
FIG. 4 is a flow chart of a program which is added to the data logger shown in FIG. 1 to implement the teachings of the invention.
Figure 7:
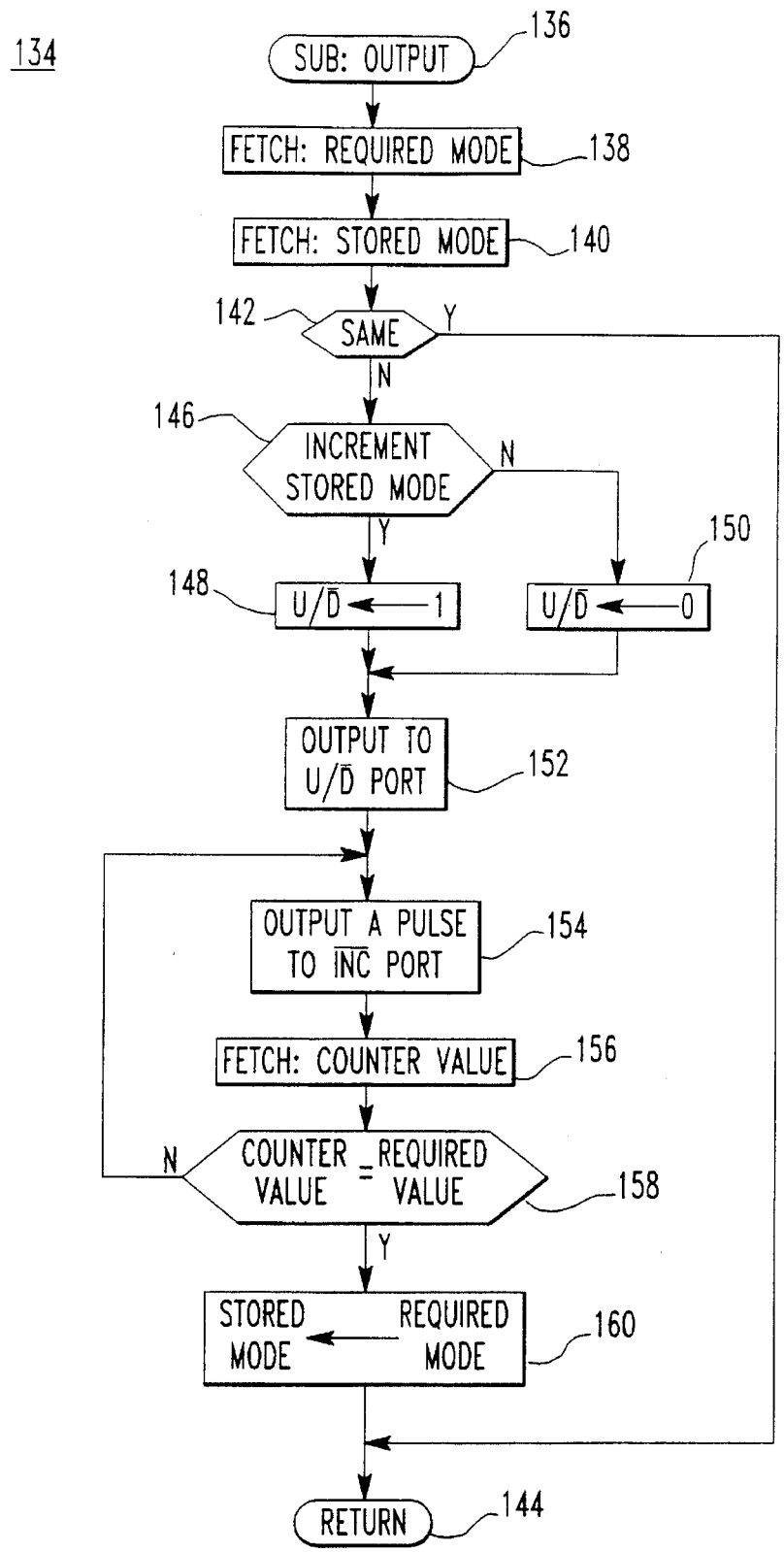
FIG. 7 is a subroutine called by the program of FIG. 4 to output control signals for operating the digitally controlled potentiometer shown in FIG. 1.

According to the teachings of the invention, data logger 36 controls the operation of refrigeration unit 10 by the addition of software programs shown in FIGS. 4 and 7 which are stored in a read-only memory (ROM) 50. Program variables are stored in a random-access memory (RAM) 52. The set point temperature for conditioned space 14 is set via data logger 36. The set point temperature SP may be selected via a key pad 54 and displayed on a display 56. The set point temperature SP may also be set from a remote point, such as from home operating base 42 via satellite 44 when vehicle 12 is an over-the-road vehicle; and, when vehicle is a refrigerated container, from a central point over electrical power lines associated with a ship, or a shipyard.

Figure 2:
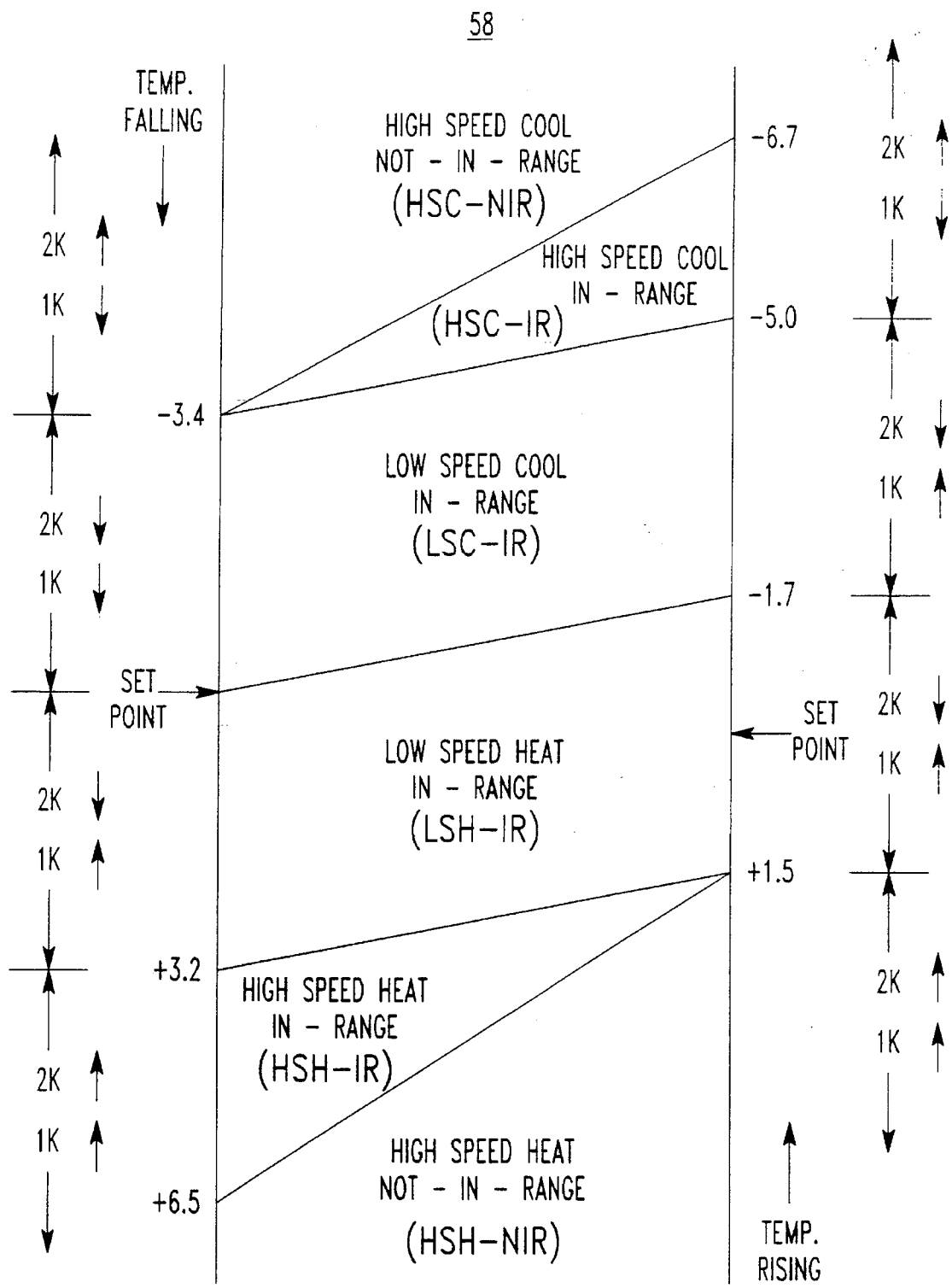
FIG. 2 is an exemplary control algorithm for operating the refrigeration unit of FIG. 1.

Data logger 36 controls refrigeration unit according to a predetermined control algorithm, such as a control algorithm 58 shown in FIG. 2, by providing a resistance value at the return air temperature inputs 30 and 32 of thermostat 26 which make thermostat 26 believe that the return air temperature RA has changed relative to the set point value selected and fixed on set point selector 28. Control algorithm 58 has been taken from U.S. Pat. No. 4,903,498, but any suitable control algorithm may be used, including a control algorithm in which a null cycle is incorporated when conditioned space 14 is satisfied. Thermostat 26 responds to a change in resistance applied to inputs 30 and 32 by appropriate control of heat and speed relays 1K and 2K, which are indicated along the right and left-hand sides of algorithm 58. Heat relay 1K configures refrigerant flow paths of refrigeration unit 10 to provide a cooling cycle or a hot gas heating cycle. Speed relay 2K selects the operating speed of the prime mover for the refrigerant compressor. This type of thermostat control of a refrigeration unit is well known, such as set forth in detail in U.S. Pat. Nos. 4,325,224 and 4,419,866, which are assigned to the same assignee as the present application, and will not be described in detail.

Data logger 36 is capable of providing fixed length digital pulses, and pulse width modulated pulses, either of which may be translated by appropriate translating means connected between data logger 36 and thermostat 26 to provide a resistance value between inputs 30 and 32 of thermostat 26 which simulate a temperature RA which causes thermostat 26 to respond as determined by data logger 36 to cause the temperature of conditioned space 14 to be pulled down to the set point temperature SP selected via data logger 36, and to maintain the temperature of conditioned space 14 in a predetermined temperature band adjacent to the selected set point temperature. For purposes of example, pulse-to-resistance translating means 60 is provided between data logger 36 and input terminals 30 and 32 of thermostat 26.

Pulse-to-resistance translating means 60 preferably includes a digitally controlled potentiometer, such as Xicor, Inc.'s E$^2$POT™ X9CMME. The Xicor X9CMME is a solid state nonvolatile potentiometer having a resistor array 62 having 99 resistive elements. The position of a wiper element is controlled by an up/down counter 64 and a one-of-one-hundred decoder 66. A chip select input /CS is tied low, and data logger 36 increments or decrements a count on counter 64 by providing a logic one or a logic zero to counter input U/D, which selects the counting direction, and by providing a predetermined number of pulses to an input/ INC. A nonvolatile memory 68 stores the position of a wiper of the resistor array 62, which is then recalled during a power-up sequence via store and recall control 70.

FIG. 2 is an exemplary control algorithm 58 which illustrates operating modes of refrigeration unit 10. Operating modes implemented by a falling temperature in conditioned space 14 are illustrated along the left-hand side of algorithm 58, and operating modes implemented by a rising temperature in conditioned space 14 are illustrated along the right-hand side of algorithm 58. The conditions of the heat and speed relays 1K and 2K, respectively, which initiate the various operating modes of refrigeration unit 10 are indicated by arrows. An upwardly pointing arrow indicates the associated relay is energized, and a downwardly pointing arrow indicates the associated relay is deenergized.

The different operating modes are triggered by predetermined temperature difference values $\Delta T$ between the temperature RA of the return air 20 and the set point temperature SP selected via data logger 36. Thus, $\Delta T$ is calculated using the relationship $\Delta T = SP - RA$. During initial temperature pull down of conditioned space 14, refrigeration unit 10 is operated in a high speed cool, not-in-range mode (HSC-NIR), which continues until $\Delta T$ drops to $-3.4$, at which point the operating mode changes to low speed cool, in-range (LSC-IR). When the temperature of conditioned space 14 reaches set point ($\Delta T=0$), the operating mode may change to low speed heat, in range (LSH-IR), switching back to LSC-IR when the temperature of conditioned space 14 rises and $\Delta T$ reaches $-1.7$. Algorithm 58 illustrates continuous operation of a prime mover and compressor of refrigeration unit 10, holding the temperature of conditioned space 14 in a predetermined temperature range adjacent to set point SP by switching back and forth between LSC-IR and LSH-IR. It would also be suitable to provide a null mode when the temperature of conditioned space 14 has been reduced to set point SP, by stopping the prime mover. A typical control algorithm having a null mode is shown in FIG. 4 of the hereinbefore mentioned U.S. Pat. No. 4,419,866.

When set point SP is reached, if LSH cannot keep the temperature of conditioned space 14 from dropping, the operating mode is changed to high speed heat, in-range (HSH-IR), when $\Delta T$ reaches $+6.5$. In a similar manner, the operating modes are changed during a rising temperature in conditioned space 14, by following the modes along the right-hand side of algorithm 58.

FIG. 3 is a chart 72 which illustrates different digital count values of up/down counter 64, and the resistance of resistor array 62 for each digital count value, using Xicor, Inc.'s X9C102, which has a resistance of 7.87 ohms per tap. Chart 72 also lists the resistance applied to the RA temperature inputs 30 and 32 of thermostat 26 for each digital count value. The resistance applied to inputs 30 and 32 is provided by a resistor 74, shown in FIG. 1, and the selected trimming value of resistor array 62. The value of resistor 74 is determined by the parameters of the RTD sensor which would normally be connected to inputs 30 and 32. With the RTD sensor selected for purposes of example, resistor 74 may have a value of 3200 ohms, for example. The temperature indicated by each of the resistive inputs to thermostat 26 is subtracted from the set point temperature fixed on set point temperature selector 28, which for purposes of example is assumed to be 32° F. (0° C.), to obtain a temperature difference value $\Delta T$ for each digital count value, which difference values are also listed in chart 72. Then, by using algorithm 58 shown in FIG. 2, the $\Delta T$'s of chart 72 which will trigger the different operating modes are selected. The operating modes are listed along the right hand side of chart 72, adjacent to a $\Delta T$ which will trigger the mode.

FIG. 4 is a flow chart of a program 76 which is stored in ROM 50, for operating refrigeration unit 10 using data logger 36 and the manually operated thermostat 26, according to the teachings of the invention. FIG. 5 is ROM map 78 stored in ROM 50, derived from Chart 72 shown in FIG. 3, which will be referred to during the description of FIGS. 4 and 7, with FIG. 7 being a subroutine called by program 76. FIG. 6 is a RAM map 80 which lists certain variables which are generated and stored during the operation of the programs shown in FIGS. 4 and 7.

Program 76 is entered periodically at 82 and step 84 fetches the set point temperature SP for conditioned space 14, which was locally or remotely set via data logger 36, and the temperature RA of the return air 20. Step 86 develops the difference value $\Delta T$ by subtracting RA from SP. Step 88 then fetches the value of RA obtained during a previous running of program 76, which will be called "stored RA". During an initial run of program 76 after power-up, an initialization flag will not have been set, and program 76 merely stores RA, sets the initialization flag, and exits. Thus, step 88 will find the previous value of RA, as indicated at "STORED RA" in RAM map 80. Step 90 compares the present value of RA with the stored value of RA to determine if the temperature of conditioned space 14 is rising or falling, in order to operate along the proper side of control algorithm 58 shown in FIG. 2. It will first be assumed that step 90 finds that the temperature in conditioned space 14 is falling, as it would during initial temperature pull down of conditioned space.

Step 90 thus branches to step 92, which compares $-\Delta T$ with the first mode switching value $-3.4$ of algorithm 58. If $\Delta T$ is less than $-3.4$, step 94 sets an address location of RAM 52 to indicate operating mode HSC-NIR. As indicated in FIG. 3, this mode may be indicated by storing digital value 000 1101 in RAM 52, at a location referred to as "MODE (REQUIRED)" in RAM map 80.

Step 96 then stores the present value of RA at location "STORED RA" of RAM map 80, so that the present RA will become the previous RA on the next running of program 76. Step 98 calls the subroutine OUTPUT shown in FIG. 7, which will be hereinafter described, and program 76 then exits at 100.

When step 92 finds that ΔT is not less than −3.4, steps 102 and 104 detect the need for the LSC-IR operating mode; steps 106 and 108 detect the need for the LSH-IR operating mode; steps 110 and 112 detect the need for the HSH-IR operating mode; and steps 110 and 114 detect the need for the HSH-NIR operating mode.

When step 90 finds that the temperature of conditioned space 14 is rising, step 90 branches to step 116. Steps 116 and 118 detect the need for the HSH-NIR operating mode; steps 120 and 122 detect the need for the LSH-IR operating mode; steps 124 and 126 detect the need for the LSC-IR operating mode; steps 128 and 130 detect the need for the HSC-IR operating mode, and steps 128 and 132 detect the need for the HSC-NIR operating mode.

Thus, by the time subroutine OUTPUT is called in step 98, the required operating mode will have been determined and stored in RAM map 80 at location MODE (REQUIRED).

Subroutine OUTPUT is implemented by a program 134 shown in FIG. 7. Program 134 is entered at 136 and step 138 fetches the required mode stored at location MODE (REQUIRED) of RAM map 80. If this is the initial running of program 134 after power-up, an initialization flag will not have been set and steps 140 and 142 are skipped and the initialization flag set. On the next running of program 134, step 140 fetches the mode required during the last running of program 134, called "stored mode", which is found at MODE (STORED) in RAM map 80. Step 142 compares the digital values of MODE (REQUIRED) and MODE (STORED), to determine if the operating mode of refrigeration unit 10 should be changed. If the modes match, nothing further need be done, and step 142 proceeds to program exit 144.

When step 142 finds that the operating mode must be changed, and also during the initial run of program 134 after power-up during which steps 140 and 142 were skipped, step 146 determines if the new mode is arrived at by incrementing the count value of the prior mode, or by decrementing the count value of the prior mode. If incrementing is required, step 148 sets a location U/D of RAM map 80 to logic one, and if decrementing is required, step 150 sets location U/D to logic zero. Step 152 outputs the logic zero, or the logic one, stored at location U/D to an Output port of data logger 36, which output port is connected to the U/D input of up-down counter 64.

Step 154 outputs a pulse to another port of data logger 36, which port is connected to the /INC input of up/down counter 64. Step 156 then fetches the actual count of up/down counter from store and recall control 70. Step 158 compares the digital count of up/down counter 64 with the digital count of MODE (REQUIRED). When the two counts do not match, step 158 returns to step 154, and this loop is repeated until step 158 finds that the digital count of up/down counter 64 has been changed to the digital count of the required operating mode. When the count values match, step 158 advances to step 160, which stores the digital count value of the required mode at location MODE (STORED), in RAM map 80, so that on the next running of program 134, the presently required mode will become the previous operating mode.

FIGS. 8A and 8B are graphs which may be combined to illustrate the outputs of data logger 36 to the U/D and /INC inputs of up/down counter 64. FIGS. 8A and 8B illustrate the selection of the operating modes along the left-hand side of algorithm 58 shown in FIG. 2, ie., during a falling temperature condition in conditioned space 14. During initial temperature pull down of conditioned space, the digital count value of up/down counter 64 will be 000 0000, and the required operating mode will be HSC-NIR, which requires a count value of 000 1101. Thus, step 146 of FIG. 7 will find that the value of up/down counter 64 must be incremented, and step 152 outputs a logic one to the U/D input of up/down counter 64, as indicated at point 162 of a graph 164 which represents the voltage applied to input U/D of up/down counter 64, versus "time". Steps 152, 154 and 156 will then go in a loop which results in up/down counter 62 being incremented 13 times by 13 output pulses 166 from data logger 36 applied to input /INC of up/down counter 64. Pulses 166 are part of a graph 168 which represents the input voltage applied to input /INC, versus "time".

When a mode change is required from HSC-NIR to LSC-IR, step 146 will find that the present count of up/down counter 64 must be decremented, step 150 stores a logic zero at location U/D of RAM map 80, and step 152 outputs the logic zero to input U/D of up/down counter 64, as indicated at point 170 of FIG. 8B. Steps 154, 156 and 158 will loop until three pulses, indicated at 172, have been applied to the /INC input of up/down counter 64, to arrive at the digital count value representing LSC-IR.

In like manner, when the selected set point temperature SP has been reached, two pulses, indicated at 174 will switch the operating mode to LSH-IR. Should the temperature of conditioned space continue to fall and operating mode HSH-IR is required, two more pulses, indicated at 176, will be applied to input /INC. Should the temperature of conditioned space 14 continue to fall and operating mode HSH-NIR is required, two additional pulses, indicated at 178, will place refrigeration unit 10 in the required operating mode.

Should the operating mode be HSH-NIR and the temperature of conditioned space 14 starts to rise, input U/D of up/down counter 64 will be set to logic one, and four pulses applied to input /INC will place refrigeration unit 10 in the LSH-IR operating mode. Two more pulses will select LSC-IR, two additional pulses will select HSC-IR, and one additional pulse will select HSC-NIR.

As hereinbefore stated, data logger 36 is also capable of providing pulse width modulated output pulses. A microprocessor may be connected to the receive the pulse width modulated pulses and interpret them to provide the outputs to up/down counter 64 to achieve the required operating mode. Since the use of the pulse width modulated output pulses from data logger 36 requires the addition of another microprocessor, the disclosed embodiment of the invention which uses fixed length output pulses is the preferred embodiment of the invention.

In summary, there has been disclosed methods and apparatus for converting a refrigeration unit having a manually controlled thermostat to remote operation via a data logger, without replacing the manually controlled thermostat, thus precluding the necessity of replacing the thermostat with a higher cost microprocessor based thermostat. In addition to achieving remote operation of refrigeration unit 10, software diagnostic routines may be incorporated in the data logger 36, to further upgrade the capabilities of refrigeration unit, without replacing the manually operable thermostat with a microprocessor based thermostat.

We claim:

1. A method of converting a refrigeration unit to remote control using a data logger which is remotely operable, with the refrigeration unit having a thermostat having a temperature input connected to a temperature sensor responsive to the temperature of a space conditioned by the refrigeration unit, and set point selector means for selecting a set point temperature for the conditioned space, comprising the steps of:

fixing the set point selector means at a predetermined temperature, disconnecting the temperature sensor from the temperature input of the thermostat, connecting a temperature sensor responsive to the temperature of the conditioned space to a temperature input of the data logger, selecting a set point temperature for the conditioned space via the data logger, determining an operating mode required to hold the selected set point temperature, and providing a signal for the temperature input of the thermostat which forces the thermostat to implement the required operating mode.

2. The method of claim 1 wherein the step of selecting a set point temperature for the conditioned space via the data logger includes the step of selecting the set point temperature at a point remote from the data logger, and communicating the selection to the data logger.

3. The method of claim 1 wherein the step of connecting a temperature sensor to a temperature input of the data logger includes the step of connecting the temperature sensor which was disconnected from the thermostat in the disconnecting step, to the temperature input of the data logger.

4. The method of claim 1 wherein the temperature sensor disconnected from the thermostat is a resistance temperature detector (RTD), and the step of providing a signal for the temperature input of the thermostat includes the step of selecting a resistance value which corresponds to a temperature of the RTD which provides a temperature difference relative to the predetermined fixed set point temperature which forces the thermostat to implement the required operating mode of the refrigeration unit.

5. In a refrigeration unit which controls the temperature of a conditioned space, including a thermostat having a temperature input, set point temperature selector means for the thermostat, data logger means having a temperature input, temperature sensor means disposed to monitor the temperature of the conditioned space, and means connecting the temperature sensor means to the temperature input of the data logger means, the improvement comprising:

means setting the set point temperature selector means of the thermostat at a predetermined fixed value, means selecting the set point temperature of the conditioned space via the data logger means, said data logger means including operating mode selector means responsive to the set point temperature selected via the data logger means and the temperature of the conditioned space, for selecting an operating mode of the refrigeration unit which will maintain the temperature of the conditioned space in a predetermined range adjacent to the selected set point temperature, and translating means connected between the data logger means and the temperature input of the thermostat, said translating means providing a signal for the temperature input of the thermostat having a value relative to the set point temperature fixed on the set point selector means of the thermostat which forces the thermostat to implement the operating mode of the refrigeration unit selected by the operating mode selector means of the data logger means.

6. The refrigeration unit of claim 5 wherein the means which selects the set point temperature of the conditioned space via the data logger means includes means for selecting the set point temperature at a point remote from the data logger means, and means for communicating the selected set point temperature to the data logger means.

7. The refrigeration unit of claim 5 wherein the temperature input of the thermostat is adapted for connection to a resistance temperature detector (RTD), and wherein the translating means includes a potentiometer having a resistance value responsive to the operating mode selected by the operating mode selecting means of the data logger means, such that the translating means applies a resistance value to the temperature input of the thermostat which corresponds to a temperature of the RTD which provides a temperature difference relative to the predetermined fixed set point temperature which forces the thermostat to implement the operating mode selected by the operating mode selecting means of the data logger means.

* * * * *